United States Patent [19]
Khayrallah

[11] Patent Number: 5,848,106
[45] Date of Patent: Dec. 8, 1998

[54] RECEIVER DECODER CIRCUITRY, AND ASSOCIATED METHOD, FOR DECODING AN ENCODED SIGNAL

[75] Inventor: Ali S. Khayrallah, Apex, N.C.

[73] Assignee: Ericsson, Inc., Research Triangle Park, N.C.

[21] Appl. No.: 767,542

[22] Filed: Dec. 16, 1996

[51] Int. Cl.⁶ .............................. H04L 27/06; H04B 1/10
[52] U.S. Cl. .................. 375/340; 375/349; 371/43.5; 455/67.3
[58] Field of Search ...................... 375/340, 349, 375/346, 341, 316; 455/63, 67.3; 371/43.1, 43.4, 43.5

[56] References Cited

U.S. PATENT DOCUMENTS 5,414,711  5/1995  Okada et al. ........................ 375/324
5,453,997  9/1995  Roney, IV ........................... 375/316

*Primary Examiner*—Stephen Chin
*Assistant Examiner*—Betsy L. Deppe
*Attorney, Agent, or Firm*—Jenkens & Gilchrist, a Professional Corporation

[57] ABSTRACT

Decoder circuitry, and an associated method, decodes an encoded signal received at a receiver. A determination is made of the levels of distortion introduced upon a signal during its transmission to a receiver upon a nonideal communication channel. If the communication channel introduces moderate amounts of distortion upon the signal, a complex decoding technique such as a standard trellis decoding technique is utilized to decode the signal. If the channel is determined to introduce only small levels of distortion upon the signal, a relatively simple, decoding technique is instead utilized.

22 Claims, 2 Drawing Sheets

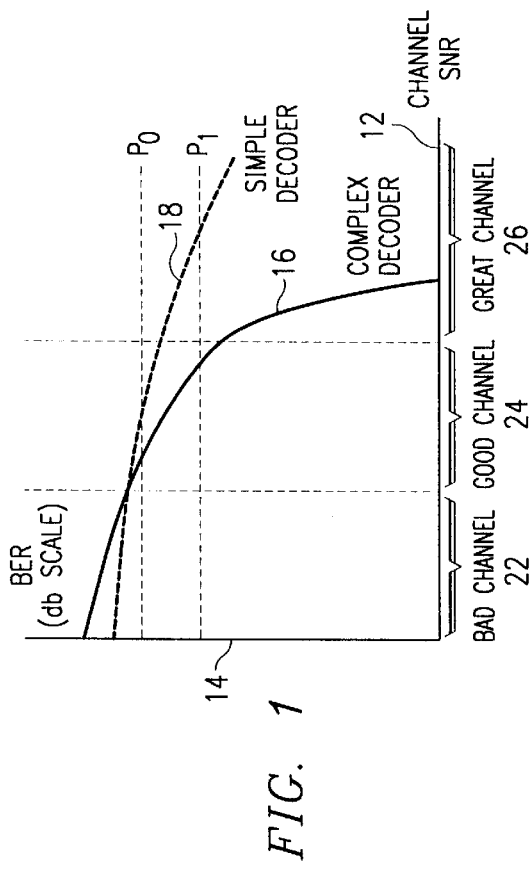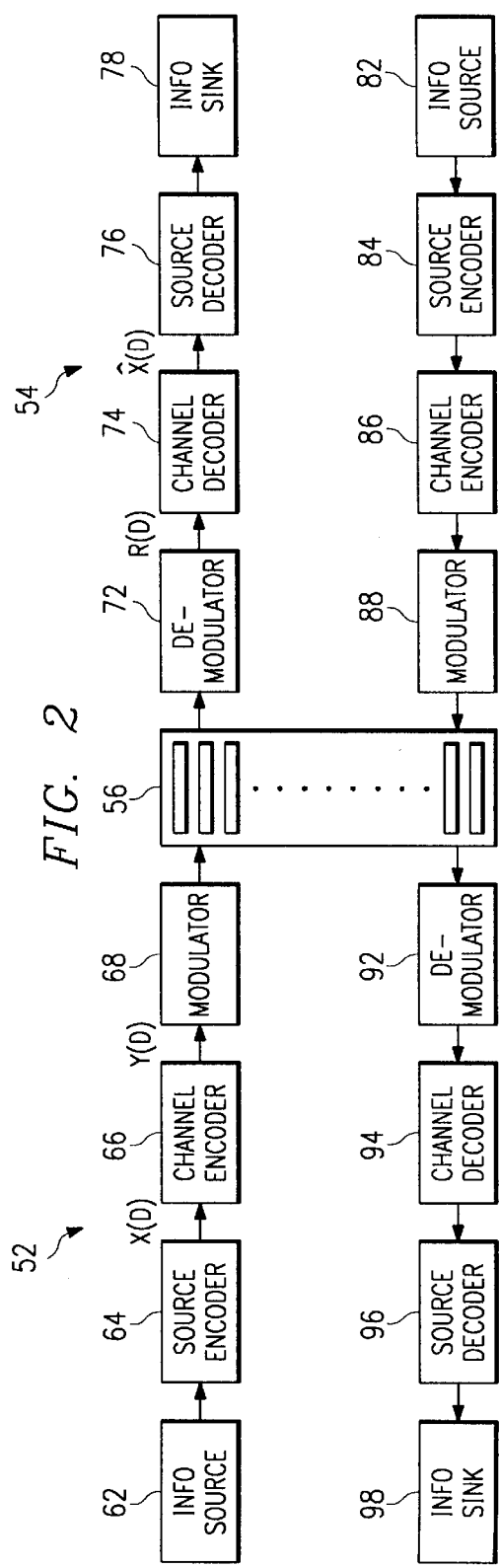

RECEIVER DECODER CIRCUITRY, AND ASSOCIATED METHOD, FOR DECODING AN ENCODED SIGNAL

The present invention relates generally to decoder circuitry for a receiver which receives an encoded signal transmitted upon a communication channel susceptible to fading, interference, and noise. More particularly, the present invention relates to decoder circuitry, and an associated method, in which the manner by which the encoded signal is decoded is dependent upon the amount of distortion introduced upon the signal during transmission of the signal upon the communication channel. When the signal is transmitted upon a communication channel which exhibits only a small amount of fading, interference, and noise, the signal is decoded by a simple decoding technique. When the signal is transmitted upon a communication channel which exhibits moderate amounts of fading, interference, and noise, the signal is decoded by a complex decoding technique.

Operation of the present invention limits decoding of an encoded signal by a complex decoding technique except when decoding by the complex decoding technique is most beneficial. When the signal is transmitted upon the communication channel which exhibits only a small amount of fading, interference, and noise, to cause only small amounts of distortion upon portions of the communication signal, such signal portions can be decoded adequately by utilizing a relatively simple decoding technique. And, when the signal is transmitted upon a communication channel which exhibits significant amounts of fading, interference, noise, or interference, that is, when decoding of the signal portion by the complex decoding technique would not be able to recover the informational content of the signal, decoding of such signal portions by the complex decoding technique is not attempted. Signal portions having such significant levels of distortion introduced thereupon are discarded or decoded in other manners. When, however, decoding of the signal by the complex decoding technique would be beneficial, for example, when moderate levels of fading, interference, and noise introduce moderate amounts of distortion upon the signal, decoding of the signal by such complex decoding technique is implemented.

Because decoding is a computationally-intensive process, a significant amount of power is required to perform the decoding operation. Minimization of power consumption is particularly important when the receiver in which the decoding is performed is powered by a portable power supply. The present invention is particularly advantageously embodied, therefore, in a portable, mobile subscriber unit operable, for example, in a cellular communication system. The present invention can similarly be advantageously be embodied in other types of communication systems.

BACKGROUND OF THE INVENTION

A communication system is formed, at a minimum, of a transmitter and a receiver interconnected by a communication channel. Communication signals transmitted by the transmitter are transmitted upon the communication channel to be received by the receiver.

A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

Technological advancements have contributed to lowered costs of communicating pursuant to a radio communication system as well as permitting new types of communication systems utilizing new types of communication schemes. For instance, digital communication techniques have been developed, and associated circuitry to effectuate such digital communication techniques have been developed. Utilization of digital communication techniques can permit a significant increase in the communication capacity of a communication system.

In a wireless communication system, the communication capacity is sometimes limited by the frequency bandwidth allocated to the communication system. Conventional, analog systems typically assign a single channel to a particular carrier. Only a single communication signal can be transmitted upon a single carrier. When the radio communication system utilizes digital modulation techniques, communication signals can be transmitted in bursts, and the bursts, once received by a receiver, concatenates the signal bursts together to recreate the communication signal therefrom. A cellular communication system is exemplary of a wireless communication system in which digital modulation techniques can be utilized to increase the communication capacity thereof. Other types of radio communication systems, and other types of communication systems, can similarly be advantageously implemented utilizing digital modulation techniques.

Transmission of a signal upon a nonideal radio frequency communication channel is susceptible to error as a result of noise and other interference introduced upon the signal during its transmission upon the transmission channel. Interference occurs, for example, because the transmission channel is actually a multi-path channel. That is to say, a signal transmitted by a transmitter is transmitted to a receiver by way of a multiple number of signal paths, each of a different length. The reception of the signal transmitted upon the multiple paths is actually a summation of a plurality of signal components, the signal components transmitted upon different ones of the multiple numbers of paths. Such reception of the signal transmitted upon the multi-path channel distorts the signal actually transmitted by a transmitter. Such distortion caused by multi-path transmission of a signal upon a nonideal channel is sometimes referred to as fading. When the multi-path channel exhibits significant levels of fading, recovery of the informational content of the transmitted signal is difficult.

To facilitate the communication of a communication signal upon a multi-path communication channel, the communication signal is encoded prior to its transmission by a transmitter. Such encoding, referred to as channel encoding, introduces redundancies into the communication signal. As a result of the introduction of such signal redundancies, some of the errors occurring as a result of transmission of the communication signal upon a multi-path communication channel can be more readily removed, once received at the receiver. Decoder circuitry operable in a manner reverse to that of the encoder circuitry at the transmitter, is utilized to decode the signal, once received by the receiver.

Decoding of an encoded signal is a computationally-intensive procedure. The power consumption required of decoder circuitry to decode an encoded signal is potentially significant. Particularly when the receiver incorporating such decoder circuitry is powered by a portable power supply, there is a need to minimize the power consumption required to operate the receiver. Any manner by which the power consumptive requirements of the decoder circuitry of such a receiver would therefore be advantageous.

It is in light of this background information related to receivers having decoder circuitry that the significant improvements of the present invention have evolved.

SUMMARY OF THE INVENTION

The present invention advantageously provides decoder circuitry, and an associated method, for decoding an encoded signal. The manner by which the encoded signal is decoded is dependent upon the amount of fading, or other signal irregularities, introduced upon the signal during transmission of the signal upon a communication channel. When the signal is transmitted upon a communication channel which exhibits good channel conditions and only a small amount of distortion of the signal occurs, the signal is decoded by a simple decoding technique. When the signal is transmitted upon a communication channel which introduces moderate amounts of distortion upon a signal, a complex decoding technique is used to decode the signal.

As significant amounts of processing is required to decode the signal according to the complex decoding technique, use of the complex decoding technique is utilized when decoding by such technique is most beneficial. When the communication channel conditions are good and only small amounts of distortion are introduced upon the signal, a relatively simple decoding technique is instead utilized to decode the signal. And, when the signal is transmitted upon a communication channel which exhibits significant amounts of fading, interference, and noise and significant amounts of distortion are introduced upon the signal during its transmission, decoding by the complex decoding technique is not attempted. Signal portions having such significant levels of distortion introduced thereupon are discarded or decoded utilizing the simple decoding technique.

Operation of an embodiment of the present invention advantageously permits reduction in the processing required to decode an encoded signal received at a receiver. The receive signal is selectively decoded by the complex decoding technique if the utilization of such a decoding technique would be beneficial. When a simpler, less computationally-intensive decoding technique can instead be utilized, the complex decoding technique is not utilized.

In one aspect of the present invention, decoding circuitry forms a portion of a mobile terminal operable in a cellular communication system. The cellular communication system may, for instance, be formed of a conventional, terrestrial system. Or, the system may be formed of, for instance, a satellite-based, cellular communication system.

When a downlink signal transmitted to the mobile terminal by a base station is received at the mobile terminal, a determination is made as to the levels of distortion introduced upon the downlink signal during its transmission to the mobile terminal. If moderate amounts of distortion are determined to have been introduced upon the signal, decoding of the receive signal utilizing a complex decoding technique is utilized. The complex decoding technique utilized in one embodiment is formed of a standard, trellis decoder, such as that visualized utilizing a Viterbi algorithm. If only a small amount of distortion is introduced upon the downlink signal during its transmission to the mobile terminal, a simple decoding technique is, instead, utilized to decode the downlink signal. In one embodiment, the simple decoding technique is formed of a right inverse matrix operation of the generator matrix utilized to encode the downlink signal at the base station. And, when significant levels of distortion are introduced upon the downlink signal during its transmission to the mobile terminal, the complex decoding technique again is not utilized to decode the receive signal. In one embodiment, the simple decoding technique is utilized to decode the receive signal when significant levels of distortion are determined to be introduced upon the downlink signal. In another embodiment, portions of the downlink signal which exhibit excessive levels of distortion are not utilized and are not decoded.

Operation of an embodiment of the present invention can similarly be utilized at a base station transceiver of a cellular communication system. And, operation of an embodiment of the present invention can analogously be utilized in other communication systems.

In these and other aspects, therefore, channel decoder circuitry, and an associated method, decodes a channel-encoded receive signal received by a digital receiver. The channel-encoded receive signal is transmitted to the digital receiver upon a communication channel susceptible to fading. A first decoder is coupled to receive a first signal representative of the channel-encoded receive signal. The first decoder forms an indication of levels of fading on the communication channel and decodes the first signal representative of the channel-encoded receive signal according to a first decoding technique. A second decoder is coupled to receive a second signal representative of the channel-encoded receive signal. The second decoder decodes the second signal according to a second decoding technique. The second decoder is operable when the indication formed by the first decoder of the levels of fading are within selected amounts.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1 illustrates a graphical representation illustrating decoder behavior as a function of channel conditions of a channel upon which a signal is transmitted to a receiver.

FIG. 2 illustrates a functional block diagram of a communication system in which an embodiment of the present invention is operable.

DETAILED DESCRIPTION

Figure 3:
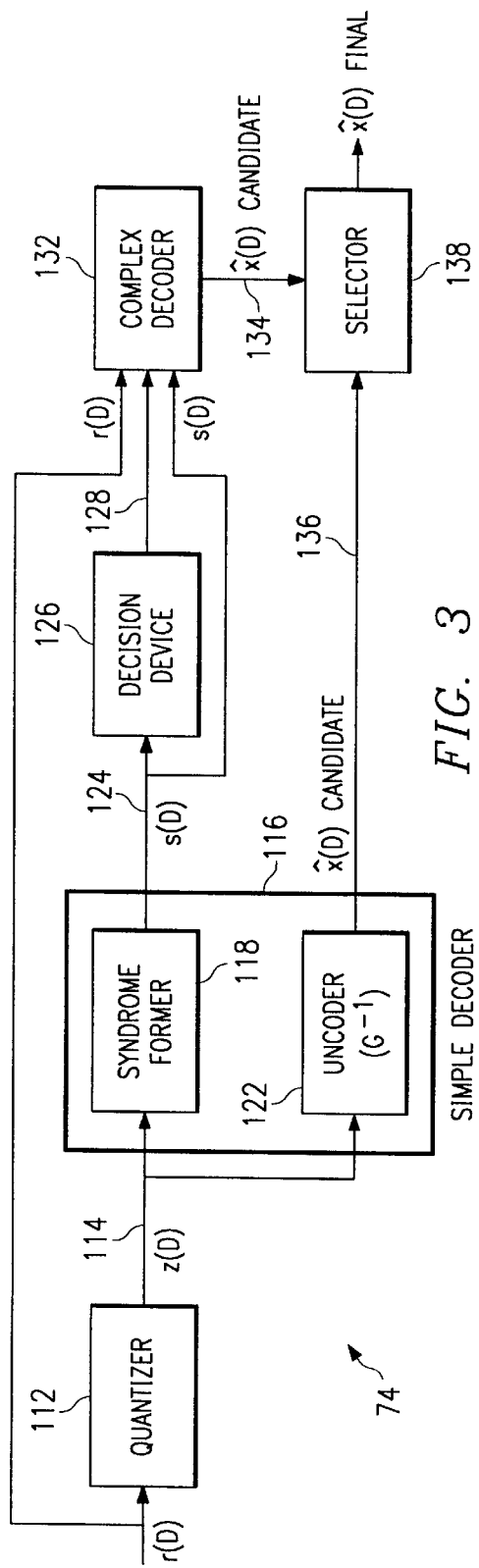
FIG. 3 illustrates a functional block diagram of decoder circuitry of an embodiment of the present invention.

FIG. 1 illustrates a graphical representation of decoder performance of a channel decoder coupled to receive indications of receive signals subsequent to their transmission upon a communication channel susceptible to fading. The abscissa axis 12 represents levels of channel signal-to-noise ratio (SNR) levels. And, the ordinate axis 14 represents levels of bit error rates (BER) of signals received subsequent to transmission upon the communication channel and decoding by a decoder utilizing a selected decoding technique.

The plot 16 is formed of the bit error rate responsive to changing channel conditions when a receive signal is decoded utilizing a complex decoding technique, such as a standard trellis decoding technique. The plot 18 is formed by plotting the bit error rate of a decoded signal responsive to changing channel conditions utilizing a simple decoding technique, such as a right inverse matrix operation corresponding to, and inverse of, a generator matrix utilized to realize a convolutional code.

The abscissa axis 12 is divided into three portions, bad channel portion 22, good channel portion 24, and great channel portion 26. The portion 22 is representative of low SNR values, portion 24 is representative of good channel SNR values, and portion 26 is representative of very good channel SNR values.

Two BER values are also indicated in the figure and designated by $P_0$ and $P_1$. The $P_1$ value is of a lower value than the $P_0$ value. The value of $P_0$ is representative of a BER level at which a decoder operable to receive speech information is operable reasonably well. The BER level is, for instance, in the range of 1% to 5%. Such level is the operating point at which at least one conventional mobile system aims. The value of $P_1$ is representative of a BER level below which channel-induced distortion is insignificant, at least compared to the distortion induced by, e.g., a channel encoder forming a portion of a transmitter which transmits the signal which is applied to the decoder.

The graphical representation of FIG. 1 is exemplary of a large bandwidth system, such as a GSM (General System for Mobile communications) system in which the channel conditions remain in a single state, i.e., very good, good, or bad, for an entire signal frame. In contrast, the channel conditions might exhibit variance within a single frame in a small bandwidth system, such as a DAMPS (Digital Advanced Mobile Phone Service) system. Decoder operation in a small bandwidth system is, however, analogous to that shown in the graphical representation of FIG. 1.

Review of the plots 16 and 18 shown in FIG. 1 indicates that when the channel exhibits very good channel conditions at portion 26, the plots 16 and 18 are both below the $P_1$ level at which speech decoders operate reasonably well. Utilization of the complex decoding technique when the channel conditions are very good is therefore not required as utilization of a simple decoding technique permits adequate decoding of a receive signal.

When the channel conditions exhibit SNR levels within the portion 24, utilization of a complex decoding technique ensures that the BER level will be beneath the $P_0$ level whereat utilization of the simple decoding technique does not ensure such operation. Utilization of the complex decoding technique is thereby advantageous when the channel SNR levels are within this range of values.

When the channel SNR levels are within the portion 22, utilization of the complex decoding technique does not provide for the BER levels to be beneath the $P_0$ level. And, as indicated in the exemplary illustration, utilization of the simple decoding technique is actually preferable. Utilization of either of the decoding techniques does not, however, provide a signal with a BER level of a permissible BER level. Information retrieved from a decoded signal decoded pursuant to either of the decoding techniques is too noisy. And, in one embodiment of the present invention, a frame exhibiting such a BER level is dropped and extrapolations are made from preceding frames.

FIG. 2 illustrates a communication system 50. In the exemplary embodiment, the communication system 50 forms a cellular communication system. Other communication systems can similarly be represented.

The portion of the cellular communication system illustrated in FIG. 2 includes a base station 52 and a single mobile terminal 54, coupled together by way of a multi-path communication channel 56. The communication channel 56 is representative of channels which permit the transmission of downlink signals to the mobile terminal 54 and to permit the transmission of uplink signals to the base station 52.

The base station 52 receives, or generates, an information signal, here shown to be generated by an information source 62. An information signal generated by the information source 62 is encoded by a source encoder 64. The source encoder, in one embodiment, digitizes the information signal applied thereto.

A source-coded signal represented by a sequence x(D):

$$x(D) = \sum_i x_i D^i$$

where $$x_i = (x_{ik} \ldots x_{(i+1)k-1})$$

The information sequence is provided to a channel encoder 66. The channel encoder 66 encodes the information sequence x(D) using a generator matrix G(D) having memory M. (The memory M is discussed in "Error control coding: Fundamentals and application", Chapter 10, by Lin and Costello). The channel encoder produces a code sequence:

$$y(D) = \sum_i y_i D^i = x(D)G(D)$$

where $$y_i = (y_{in} \ldots y_{(i+1)n-1})$$

From G(D), a corresponding state diagram having $2^M$ states can be constructed. Each edge of the state diagram is labeled with an input k-tuple and a code n-tuple. In addition, a corresponding trellis diagram with $2^M$ states is constructed. The trellis starts and ends in the all-zero state. The generator matrix G(D) is chosen such that the matrix is in feedforward form and such that it accepts an inverse $G^{-1}(D)$ which also has a feedforward form. Details of similar such matrices can be found in a text entitled "Error Control Coding: Fundamentals And Applications", Chapter 10, by Lin and Costello.

A binary sequence y(D) is generated by the channel encoder 66 and is mapped into a BPSK (binary phase shift keying) sequence by a demodulator 68 and caused to be transmitted by the demodulator 68 upon the communication channel 56 to be received by the mobile terminal 54. The mobile terminal 54 receives the downlink signal transmitted thereto and includes demodulator circuitry 72 for demodulating the downlink signal received thereat. The demodulator 72 generates a demodulated signal, r(D), represented mathematically by:

$$r(D) = \sum_i r_i D^i,$$

where $$r = (r_{in} \ldots r_{(i+n)n-1})$$

and $r_j$ is a real number.

A binary, hard-decision sequence, z(D) of r(D) can also be defined. z(D) corresponds with y(D) when the communication channel 56 forms a noiseless communication channel.

The demodulated signal generated by the demodulator is provided to a channel decoder 74. The channel decoder is operable to channel decode the signal applied thereto. Operation of the channel decoder 74 shall be described in greater detail below. The channel decoder 74 generates a channel decoded signal, $\hat{x}(D)$.

The channel decoded signal is provided to a source decoder 76 which source decodes the signal applied thereto. The source decoder, in turn, applies the source decoded signal generated thereat to an information sink 78.

The mobile terminal further includes an information source 82 at which an information signal to be communicated to the base station 52 is generated. The information signal generated at the information source 82 is encoded by a source encoder 84 which, analogous to the source encoder 64, might include an analog-to-digital converter for digitizing the information signal applied thereto.

The source-encoded signal generated by the source encoder 84 is applied to a channel encoder 86 which channel-encodes the signal applied thereto. A channel-encoded encoded signal generated by the encoder 86 is applied to a modulator 88. The modulator 88 is operable in a manner analogous to operation of the modulator 68 to modulate the encoded signal and to cause its transmission upon the communication channel 56 to form the uplink signal which is transmitted to the base station 52.

The base station 52 is further shown to include a demodulator 92 operable to demodulate the uplink signal received thereat. A demodulated signal generated by the demodulator 92 is applied to a channel decoder 94. The channel decoder 94 decodes the received signal. A decoded signal generated by the decoder 94 is applied to a source decoder 96 which generates a source-decoded signal which is applied to an information sink 98.

While not separately shown, the signals generated by the various elements 82–96 can be represented in analogous fashion to the representations of the corresponding structures 64–76.

FIG. 3 illustrates the channel decoder 74 in greater detail. In one embodiment, the channel decoder 94 is similar in construction to that of the channel decoder 74 and is similarly represented.

The demodulated signal, $r(D)$, generated by the demodulator 72 (shown in FIG. 2) is provided to a quantizer 112. The quantizer generates a quantized sequence, $z(D)$ on line 114 which is provided to a firstpass decoder 116.

The first-pass decoder 116 includes a syndrome former 118 and an uncoder 122.

The syndrome former 118 performs a parity check utilizing a $(n-k) \times n$ parity check matrix $H(D)$ corresponding to the $G(D)$, noted previously. The constraint length $\mu$ of $H(D)$ is the largest polynomial degree in $H(D)$. For any sequence $z(D)$, the syndrome sequence, $s(D)$ is given by:

$$s(D) = z(D)H^T(D),$$

where $$S_i = \sum_{j=0}^{u} Z_{i-j} H_j^T$$

$z(D)$ is a code sequence for $G(D)$ if $s(D)=0$, i.e., if every bit of every $S_i$ is O. A syndrome sequence of a convolutional code exhibits a property that its components $S_i$ are local functions. Viz., the equation shows that $S_i$ is a function of $z_{i-\mu}, \ldots, z_i$. Whenever, $s_i \neq 0$ (i.e., one or more of its (n-k) bits is nonzero), there is an indication that $Z_{i-\mu}, \ldots, z_i$ is not a valid section of a code sequence. This means that a fading or other distortion problem has caused an error in a local window $z_{i-\mu} \ldots z_i$ of a frame.

Figure 4:
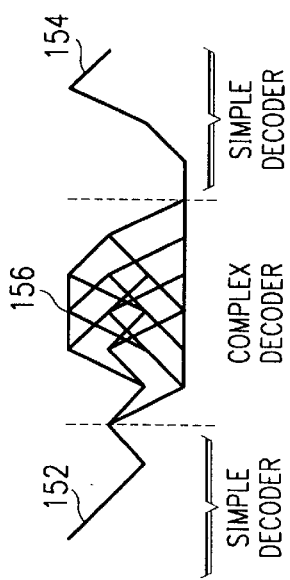
FIG. 4 illustrates schematically, exemplary operation of the decoder circuitry shown in FIG. 3.

When the complex decoder is activated to deal with an occurrence of $s_j \neq 0$, first determines a section of the received vector $r(D)$ to process. To do so, it looks back from i to find a number L of contiguous locations such that $s_{j-L+1} = 0, \ldots, s_j = 0$. This means that $z_{j-L+1-\mu} \ldots z_j$ is a valid section of a code sequence. The number L must be chosen Large enough so that the state of the trellis is determined unambiguously from $z_{j-L+1-\mu} \ldots z_j$. If the complex decoder reaches the beginning of the trellis without finding the required L contiguous locations, then it chooses the all-zero state, which is the known starting state of the trellis. Similarly, the complex decoder looks ahead from i to find a number L of contiguous locations j'-L+1, ..., j' such that $s_{j'-L+1}' = 0, \ldots, z_{j'}' = 0$. Again, the state of the trellis is determined from $z_{j'-L+1-\mu}' \ldots z_{j'}'$. If the complex decoder reaches the end of the trellis without finding the required L contiguous locations, then it chooses the all-zero state, which is the known ending state of the trellis. The complex decoder now has a starting state and an ending state on the trellis, and it can operate on the appropriate section of $r(D)$ between those two states, as illustrated in FIG. 4.

The syndrome sequence, $s(D)$ is provided by way of line 124 to a decision device 126. The decision device 126 determines whether the components si of the syndrome sequence are equal to zero. When the channel conditions are very good, such components are of zero values. The decision device 126 further generates a control signal on line 128 which is provided to a complex decoder 132. When the decision device 126 determines the components of the syndrome sequence to be of zero values, the control signal generated on 128 prevents operation of the complex decoder 132.

If, conversely, the syndrome sequence includes non-zero values, the control signal generated on the line 128 permits the complex decoder 132 to decode the demodulated signal, $r(D)$ according to a standard trellis decoding technique, such as that utilized during execution of a Viterbi algorithm. Line 124 is also coupled to the decoder 132 to provide the syndrome sequence generated by the syndrome former 118 thereto. The decoder 132 generates a decoded signal forming a candidate decoded signal on line 134.

The uncoder 122 is implemented by a right inverse matrix $G^{-1}(D)$ of $G(D)$. The signal applied to the uncoder 122 on line 114 is operated upon by the rate inverse matrix and the resultant values form a decoded signal candidate generated on line 136. Lines 134 and 136 are coupled to a selector 138. When the complex decoder 132 is operable, the selector selects the decoded signal applied thereto on line 134 to form the final decoded signal which is provided to the source decoder 76 (shown in FIG. 2). When the complex decoder 132 is not operable, the selector 138 instead selects the signal applied thereto on line 136 to form the final, decoded signal.

FIG. 4 illustrates exemplary operation of the decoder 74. In the exemplary operation, the syndrome sequence is generally of a value of zero, the second-pass decoder 132 is not enabled, and the final decoded signal is generated by the uncoder 122 of the first-pass decoder 116. For example, in one percent of the locations of a received sequence, the syndrome sequence is of a non-zero value. The decision device, at such times, enables operation of the second-pass decoder 132 and such operation is indicated in the figure by the trellis formed of possible signal paths 156 during operation of the decoder 132.

When the communication channel forms a good communication channel, such as that defined by portion 24 shown in FIG. 1, operation of the second-pass decoder 132 is enabled over a larger portion of the demodulated signal, perhaps even all of the signal.

When the channel conditions are poor, such as those indicated by the portion 22 shown in FIG. 1, the complex decoder 132 is again not enabled. Instead, the decoded signal is formed by the uncoder 122 of the first-pass decoder 116, or a decision is made to declare a decoding failure and the frame of data is not utilized.

Figure 5:
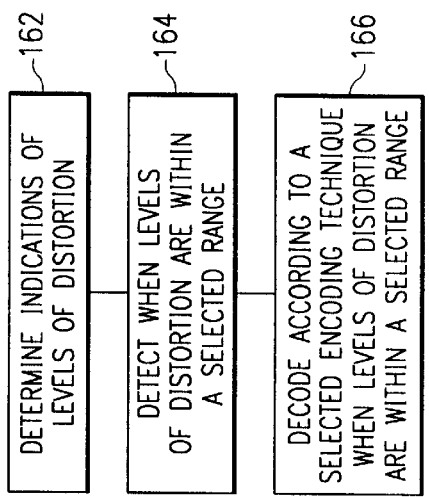
FIG. 5 illustrates a method flow diagram listing the method steps of the method of an embodiment of the present invention.

FIG. 5 illustrates a method, shown generally at 160, of a method of an embodiment of the present invention. The method 160 decodes a channel-encoded receive signal transmitted upon a communication channel susceptible to fading.

First, and as indicated by block 162, indications of levels of fading of the channel-encoded receive signal are determined.

Then, and as indicated by the block 164, times when the levels of the fading of the channel-encoded receive signal are within a selected range are detected. And, as indicated by the block 166, the signal representative of the channel-encoded receive signal is decoded according to a selected decoding technique when the levels of the fading of the channel-encoded receive signal are within the selected range.

Operation of an embodiment of the present invention reduces the processing required to generate a decoded signal. When the signal transmitted to a receiver including the decoder exhibits only a small amount of fading, utilization of the complex decoding technique is not utilized. Utilization of the complex decoding technique occurs when such utilization provides greatest advantage, i.e., when the channel conditions exhibit moderate amounts of fading.

The previous descriptions are of preferred examples for implementing the invention, and the scope of the invention should not necessarily be limited by this description. The scope of the present invention is defined by the following claims.

What is claimed is:

1. In a receiver which receives a channel-encoded receive signal transmitted upon a communication channel, channel decoder circuitry for decoding the channel-encoded receive signal, said decoder circuitry comprising:

a first decoder coupled to receive a first signal representative of the channel-encoded receive signal, said first decoder for forming an indication of levels of distortion introduced upon the channel-encoded receive signal during transmission thereof upon the communication channel and for decoding the first signal representative of the channel-encoded receive signal according to a first decoding technique; and a second decoder coupled to receive a second signal representative of the channel-encoded receive signal, said second decoder for decoding the second signal according to a second decoding technique, said second decoder operable when the indication formed by said first decoder of the levels of distortion are within selected amounts.

2. The channel decoder circuitry of claim 1 further comprising a quantizer for generating a quantized signal, the quantized signal generated by said quantizer forming the first signal representative of the channel-encoded receive signal to which said first decoder is coupled to receive.

3. The channel decoder circuitry of claim 2 wherein said first decoder further comprises a syndrome former coupled to receive the quantized signal generated by said quantizer, said syndrome former for generating a syndrome sequence, the syndrome sequence forming the indication of the levels of distortion.

4. The channel decoder circuitry of claim 3 wherein said quantizer quantizes signal portions of the signal representative of the channel-encoded signal into binary values, the quantized signal generated by said quantizer of the binary values.

5. The channel decoder circuitry of claim 3 wherein signal portions of the syndrome sequence forming the indication are of first values when decoding errors are detected and are of second values when decoding errors are absent.

6. The channel decoder circuitry of claim 3 wherein the syndrome former further performs a parity check of the syndrome sequence.

7. The channel decoder circuitry of claim 6 wherein the channel-encoded receive signal is encoded pursuant to a convolutional encoding technique having a selected matrix size and wherein said parity check is performed using a parity checker matrix of a matrix size corresponding to the selected matrix size.

8. The channel decoder circuitry of claim 3 wherein said first decoder further comprises an uncoder coupled to receive the quantified signal generated by said quantizer, said uncoder including a right inverse matrix for generating a first channel-decoded signal from the quantified signal.

9. The channel decoder circuitry of claim 8 further comprising a selector coupled to receive the first channel-decoded signal generated by said uncoder and coupled to receive a second channel-decoded signal generated by said second decoder, said selector for selecting between the first channel-decoded signal and the second, channel-decoded signal in response to the indications of the levels of distortion.

10. The channel decoder circuitry of claim 1 further comprising a decision device coupled to recieve a syndrome sequence, wherein said decision device determines whether components of the syndrome sequence include zero values and generates the selected value for the control signal if the syndrome sequence includes zero values.

11. The channel decoder circuitry of claim 3 wherein a decision device is further coupled to said second decoder, said decision device for generating a control signal for application to said second decoder, and wherein said second decoder is operable when the control signal is of a selected value.

12. The channel decoder circuitry of claim 1 wherein the channel-encoded receive signal is encoded according to an encoding technique having a selected number of states and wherein said second decoder decodes the second signal representative of the channel-encoded receive signal into a corresponding selected number of possible states.

13. The channel decoder circuitry of claim 1 wherein the receiver comprises a cellular transceiver receiver portion having a source decoder and wherein at least alternately a first decoded signal generated by said first decoder and a second decoded signal generated by said second decoder is applied to the source decoder.

14. A method for decoding a channel-encoded receive signal transmitted upon a communication channel, said method comprising the steps of:

receiving the channel-encoded receiver signal;

determining levels of distortion introduced upon the channel-encoded receive signal during transmission thereof upon the communication channel;

decoding the channel-encoded receive signal using a first decoding technique;

detecting when the levels of the distortion of the channel-encoded receive signal are within a selected range; and decoding the channel-encoded receive signal according to a second decoding technique when the levels of the distortion of the channel-encoded receive signal are within the selected range.

15. The method of claim 14, wherein the step of determining further comprises the step of generating a syndrome sequence having a plurality of components, wherein non-zero valued components indicate a level of distortion.

16. The method of claim 14, wherein the step of decoding using a first decoding technique further comprises the step of decoding the channel encoded signal using a right inverse matrix.

17. The method of claim 14 further including the step of quantitizing the received channel encoded receiver signal.

18. The method of claim 14 further including the step of selecting between the channel encoded receive signal decoded using the first decoding technique and the channel encoded receive signal decoded using the second decoding technique.

19. The method of claim 14, wherein the step of decoding according to a second technique further includes the step of enabling and disabling a decoder performing the second decoding technique.

20. Decoder circuitry, comprising:

a syndrome former coupled to a received channel encoded receive signal for generating a distortion signal indicating a distortion level of the received channel encoded receive signal;

a first decoder for decoding the received channel encoded receive signal according to a first decoding technique to generate a first decoded signal;

a second decoder for decoding the received channel encoded receive signal according to a second decoding technique to generate a second decoded signal;

a decision device for enabling the second decoder in response to an indication by the distortion signal of a predetermined distortion level; and a selector for selecting the second decoding signal when the second decoder is enabled.

21. The channel decoder circuitry of claim 20 further comprising a quantizer for generating a quantified signal, the quantified signal generated by said quantizer coupled to the first decoder.

22. The channel decoder circuitry of claim 21, wherein said first decoder further comprises an uncoder coupled to receive the quantified signal generated by said quantizer, said uncoder of a matrix size corresponding to the selected matrix size, said uncoder for generating a first channel-decoded signal responsive to decoding of the quantified signal according to the first decoding technique.

* * * * *

UNITED STATES PATENT AND TRADEMARK OFFICE
CERTIFICATE OF CORRECTION

PATENT NO. : 5,848,106
DATED : December 8, 1998
INVENTOR(S) : Ali S. Khayrallah

It is certified that error appears in the above-identified patent and that said Letters Patent is hereby corrected as shown below:

Front Page [56]   After U.S. PATENT DOCUMENTS insert --
4,167,701  9/79  Kuki et al.........325/41
4,486,882  12/84  Piret et al......... 371/45

FOREIGN PATENT DOCUMENTS
WO 96/02091         1/96   WIPO
GB  2 253 546A      9/92   UK
GB  2 253 123 A     8/92   UK
0 632 613 A1        1/95   EPO
ISR for PCT/US97/22864 12/97 WIPO--

Column 7,
Line 44 replace "firstpass" with --first-pass--
Line 56 replace "u" with --$\mu$--

Column 10,
Lines 30-32 delete "further comprising a decision device coupled to receive a syndrome sequence,"

Line 36 replace "a" with --said--

Signed and Sealed this

Nineteenth Day of June, 2001

*Attest:*

NICHOLAS P. GODICI
*Attesting Officer*   Acting Director of the United States Patent and Trademark Office